(12) United States Patent
Pierce et al.

(10) Patent No.: US 8,977,439 B2
(45) Date of Patent: Mar. 10, 2015

(54) VEHICLE IMAGING SYSTEM PROVIDING MULTI-STAGE AIMING STABILITY INDICATION

(71) Applicant: Gentex Corporation, Zeeland, MI (US)

(72) Inventors: Phillip R Pierce, Grand Rapids, MI (US); David M Falb, Grand Rapids, MI (US)

(73) Assignee: Genetex Corporation, Zeeland, MI (US)

( * ) Notice: Subject to any disclaimer, the term of this patent is extended or adjusted under 35 U.S.C. 154(b) by 36 days.

(21) Appl. No.: 13/915,829

(22) Filed: Jun. 12, 2013

(65) Prior Publication Data

US 2013/0332034 A1  Dec. 12, 2013

Related U.S. Application Data

(60) Provisional application No. 61/658,686, filed on Jun. 12, 2012.

(51) Int. Cl.
```
B60R 1/00        (2006.01)
B60R 1/08        (2006.01)
B60R 1/04        (2006.01)
```
(52) U.S. Cl.
CPC ... *B60R 1/00* (2013.01); *B60R 1/08* (2013.01); *B60R 1/04* (2013.01)
USPC .......................................................... 701/49

(58) Field of Classification Search
CPC ................ B60R 1/00; B60R 1/04; B60R 1/08
USPC .......................................................... 701/49
See application file for complete search history.

(56) References Cited

U.S. PATENT DOCUMENTS 2,131,888 A   10/1938   Harris
2,632,040 A    3/1953   Rabinow
(Continued)

FOREIGN PATENT DOCUMENTS

CN   102025925    4/2011
DE     2946561    5/1981
(Continued)

OTHER PUBLICATIONS

Patent Cooperation Treaty, International Searching Authority, International Search Report, Written Opinion of the International Searching Authority and Notification of Transmittal, Oct. 2, 2013, 7 Pages.
(Continued)

*Primary Examiner* — James Trammell
*Assistant Examiner* — Frederick Brushaber
(74) *Attorney, Agent, or Firm* — Price Heneveld LLP; Scott P. Ryan

(57) ABSTRACT

A system is provided for controlling equipment of a controlled vehicle, including: an imaging system including an image sensor configured to acquire images of a scene external of the controlled vehicle and to generate image data corresponding to the acquired images; and a controller in communication with the imaging system. The controller is configured to receive and analyze the image data, to generate a control signal that is used to control the equipment, and to automatically aim the image sensor. The controller may analyze the image data to determine a stability state for the aim of the image sensor. The control signal may include an aim stability indication.

19 Claims, 3 Drawing Sheets

(56) References Cited

U.S. PATENT DOCUMENTS

| | | |
|---|---|---|
| 2,827,594 A | 3/1958 | Rabinow |
| 3,179,845 A | 4/1965 | Kulwiec |
| 3,581,276 A | 5/1971 | Newman |
| 3,663,819 A | 5/1972 | Hicks et al. |
| 4,139,801 A | 2/1979 | Linares |
| 4,151,526 A | 4/1979 | Hinachi et al. |
| 4,236,099 A | 11/1980 | Rosenblum |
| 4,258,979 A | 3/1981 | Mahin |
| 4,286,308 A | 8/1981 | Wolff |
| 4,357,558 A | 11/1982 | Massoni et al. |
| 4,376,909 A | 3/1983 | Tagami et al. |
| 4,479,173 A | 10/1984 | Rumpakis |
| 4,599,544 A | 7/1986 | Martin |
| 4,645,975 A | 2/1987 | Meitzler et al. |
| 4,665,321 A | 5/1987 | Chang et al. |
| 4,692,798 A | 9/1987 | Seko et al. |
| 4,716,298 A | 12/1987 | Etoh |
| 4,727,290 A | 2/1988 | Smith et al. |
| 4,768,135 A | 8/1988 | Kretschmer et al. |
| 4,862,037 A | 8/1989 | Farber et al. |
| 4,891,559 A | 1/1990 | Matsumoto et al. |
| 4,930,742 A | 6/1990 | Schofield et al. |
| 4,934,273 A | 6/1990 | Endriz |
| 4,967,319 A | 10/1990 | Seko |
| 5,008,946 A | 4/1991 | Ando |
| 5,036,437 A | 7/1991 | Macks |
| 5,072,154 A | 12/1991 | Chen |
| 5,086,253 A | 2/1992 | Lawler |
| 5,096,287 A | 3/1992 | Kakinami et al. |
| 5,124,549 A | 6/1992 | Michaels et al. |
| 5,166,681 A | 11/1992 | Bottesch et al. |
| 5,182,502 A | 1/1993 | Slotkowski et al. |
| 5,187,383 A | 2/1993 | Taccetta et al. |
| 5,235,178 A | 8/1993 | Hegyi |
| 5,329,206 A | 7/1994 | Slotkowski et al. |
| 5,347,261 A | 9/1994 | Adell |
| 5,347,459 A | 9/1994 | Greenspan et al. |
| 5,355,146 A | 10/1994 | Chiu et al. |
| 5,379,104 A | 1/1995 | Takao |
| 5,396,054 A | 3/1995 | Krichever et al. |
| 5,402,170 A | 3/1995 | Parulski et al. |
| 5,414,493 A * | 5/1995 | Fujii et al. .................... 399/112 |
| 5,416,318 A | 5/1995 | Hegyi |
| 5,426,294 A | 6/1995 | Kobayashi et al. |
| 5,428,464 A | 6/1995 | Silverbrook |
| 5,430,450 A | 7/1995 | Holmes |
| 5,434,407 A | 7/1995 | Bauer et al. |
| 5,451,822 A | 9/1995 | Bechtel et al. |
| 5,452,004 A | 9/1995 | Roberts |
| 5,471,515 A | 11/1995 | Fossum et al. |
| 5,475,441 A | 12/1995 | Parulski et al. |
| 5,481,268 A | 1/1996 | Higgins |
| 5,483,346 A | 1/1996 | Butzer |
| 5,485,155 A | 1/1996 | Hibino |
| 5,508,592 A | 4/1996 | Lapatovich et al. |
| 5,537,003 A | 7/1996 | Bechtel et al. |
| 5,541,724 A | 7/1996 | Hoashi |
| 5,550,677 A | 8/1996 | Schofield et al. |
| 5,554,912 A | 9/1996 | Thayer et al. |
| 5,574,463 A | 11/1996 | Shirai et al. |
| 5,587,929 A | 12/1996 | League et al. |
| 5,592,146 A | 1/1997 | Kover, Jr. |
| 5,614,788 A | 3/1997 | Mullins et al. |
| 5,621,460 A | 4/1997 | Hatlestad et al. |
| 5,660,454 A | 8/1997 | Mori et al. |
| 5,666,028 A | 9/1997 | Bechtel et al. |
| 5,684,473 A | 11/1997 | Hibino et al. |
| 5,707,129 A | 1/1998 | Kobayashi |
| 5,710,565 A | 1/1998 | Shirai et al. |
| 5,714,751 A | 2/1998 | Chen |
| 5,715,093 A | 2/1998 | Schierbeek et al. |
| 5,736,816 A | 4/1998 | Strenke et al. |
| 5,751,832 A | 5/1998 | Panter et al. |
| 5,781,105 A | 7/1998 | Bitar et al. |
| 5,786,787 A | 7/1998 | Eriksson et al. |
| 5,796,094 A | 8/1998 | Schofield et al. |
| 5,798,727 A | 8/1998 | Shirai et al. |
| 5,811,888 A | 9/1998 | Hsieh |
| 5,812,321 A | 9/1998 | Schierbeek et al. |
| 5,837,994 A | 11/1998 | Stam et al. |
| 5,841,126 A | 11/1998 | Fossum et al. |
| 5,845,000 A | 12/1998 | Breed et al. |
| 5,850,254 A * | 12/1998 | Takano et al. .................. 348/148 |
| 5,867,214 A | 2/1999 | Anderson et al. |
| 5,877,897 A | 3/1999 | Schofield et al. |
| 5,905,457 A | 5/1999 | Rashid |
| 5,912,534 A | 6/1999 | Benedict |
| 5,923,027 A | 7/1999 | Stam et al. |
| 5,935,613 A | 8/1999 | Benham et al. |
| 5,942,853 A | 8/1999 | Piscart |
| 5,990,469 A | 11/1999 | Bechtel et al. |
| 6,008,486 A | 12/1999 | Stam et al. |
| 6,018,308 A | 1/2000 | Shirai |
| 6,049,171 A | 4/2000 | Stam et al. |
| 6,097,023 A | 8/2000 | Schofield et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,144,158 A | 11/2000 | Beam |
| 6,166,698 A | 12/2000 | Turnbull et al. |
| 6,184,781 B1 | 2/2001 | Ramakesavan |
| 6,255,639 B1 | 7/2001 | Stam et al. |
| 6,281,632 B1 | 8/2001 | Stam et al. |
| 6,329,925 B1 | 12/2001 | Skiver et al. |
| 6,349,782 B1 | 2/2002 | Sekiya et al. |
| 6,356,376 B1 | 3/2002 | Tonar et al. |
| 6,379,013 B1 | 4/2002 | Bechtel et al. |
| 6,396,040 B1 | 5/2002 | Hill |
| 6,396,397 B1 | 5/2002 | Bos et al. |
| 6,403,942 B1 | 6/2002 | Stam |
| 6,442,465 B2 | 8/2002 | Breed et al. |
| 6,443,602 B1 | 9/2002 | Tanabe et al. |
| 6,465,962 B1 | 10/2002 | Fu et al. |
| 6,469,739 B1 | 10/2002 | Bechtel et al. |
| 6,483,438 B2 | 11/2002 | DeLine et al. |
| 6,491,416 B1 | 12/2002 | Strazzanti |
| 6,507,779 B2 | 1/2003 | Breed et al. |
| 6,550,943 B2 | 4/2003 | Strazzanti |
| 6,553,130 B1 | 4/2003 | Lemelson et al. |
| 6,558,026 B2 | 5/2003 | Strazzanti |
| 6,587,573 B1 | 7/2003 | Stam et al. |
| 6,611,610 B1 | 8/2003 | Stam et al. |
| 6,617,564 B2 | 9/2003 | Ockerse et al. |
| 6,631,316 B2 | 10/2003 | Stam et al. |
| 6,677,986 B1 | 1/2004 | Pöchmüller |
| 6,772,057 B2 | 8/2004 | Breed et al. |
| 6,774,988 B2 | 8/2004 | Stam et al. |
| 6,861,809 B2 | 3/2005 | Stam |
| 6,902,307 B2 | 6/2005 | Strazzanti |
| 6,913,375 B2 | 7/2005 | Strazzanti |
| 6,946,978 B2 | 9/2005 | Schofield |
| 7,012,543 B2 | 3/2006 | DeLine et al. |
| 7,038,577 B2 | 5/2006 | Pawlicki et al. |
| 7,255,465 B2 | 8/2007 | DeLine et al. |
| 7,262,406 B2 | 8/2007 | Heslin et al. |
| 7,265,342 B2 | 9/2007 | Heslin et al. |
| 7,311,428 B2 | 12/2007 | DeLine et al. |
| 7,321,112 B2 | 1/2008 | Stam et al. |
| 7,417,221 B2 | 8/2008 | Creswick et al. |
| 7,446,650 B2 | 11/2008 | Schofield et al. |
| 7,467,883 B2 | 12/2008 | DeLine et al. |
| 7,468,651 B2 | 12/2008 | DeLine et al. |
| 7,485,844 B2 | 2/2009 | Stam et al. |
| 7,533,998 B2 | 5/2009 | Schofield et al. |
| 7,565,006 B2 | 7/2009 | Stam et al. |
| 7,567,291 B2 | 7/2009 | Bechtel et al. |
| 7,653,215 B2 | 1/2010 | Stam |
| 7,658,521 B2 | 2/2010 | DeLine et al. |
| 7,683,326 B2 | 3/2010 | Stam et al. |
| 7,719,408 B2 | 5/2010 | DeWard et al. |
| 7,720,580 B2 | 5/2010 | Higgins-Luthman |
| 7,815,326 B2 | 10/2010 | Blank et al. |
| 7,877,175 B2 | 1/2011 | Higgins-Luthman |

(56) References Cited

U.S. PATENT DOCUMENTS

| | | | |
|---|---|---|---|
| 7,881,839 | B2 | 2/2011 | Stam et al. |
| 7,888,629 | B2 | 2/2011 | Heslin et al. |
| 7,914,188 | B2 | 3/2011 | DeLine et al. |
| 7,972,045 | B2 | 7/2011 | Schofield |
| 7,974,748 | B2 | 7/2011 | Goerick et al. |
| 7,994,471 | B2 | 8/2011 | Heslin et al. |
| 8,045,760 | B2 | 10/2011 | Stam et al. |
| 8,063,753 | B2 | 11/2011 | DeLine et al. |
| 8,065,053 | B2 | 11/2011 | Stam et al. |
| 8,090,153 | B2 | 1/2012 | Schofield et al. |
| 8,100,568 | B2 | 1/2012 | DeLine et al. |
| 8,116,929 | B2 | 2/2012 | Higgins-Luthman |
| 8,120,652 | B2 | 2/2012 | Bechtel et al. |
| 8,142,059 | B2 | 3/2012 | Higgins-Luthman et al. |
| 8,162,518 | B2 | 4/2012 | Schofield |
| 8,203,433 | B2 | 6/2012 | Deuber et al. |
| 8,217,830 | B2 | 7/2012 | Lynam |
| 8,222,588 | B2 | 7/2012 | Schofield et al. |
| 8,258,433 | B2 | 9/2012 | Byers et al. |
| 8,325,028 | B2 | 12/2012 | Schofield et al. |
| 2002/0040962 | A1 | 4/2002 | Schofield et al. |
| 2003/0202357 | A1 | 10/2003 | Strazzanti |
| 2004/0125905 | A1 | 7/2004 | Vlasenko et al. |
| 2006/0115123 | A1* | 6/2006 | Kanai et al. ................ 382/104 |
| 2007/0154063 | A1* | 7/2007 | Breed ........................ 382/100 |
| 2008/0192132 | A1 | 8/2008 | Bechtel et al. |
| 2008/0294315 | A1* | 11/2008 | Breed ........................ 701/49 |
| 2013/0028473 | A1 | 1/2013 | Hilldore et al. |

FOREIGN PATENT DOCUMENTS

| | | |
|---|---|---|
| FR | 2641237 | 7/1990 |
| FR | 2726144 | 4/1996 |
| GB | 2313973 | 12/1997 |
| JP | 5744541 | 3/1982 |
| JP | 6015237 | 1/1985 |
| JP | 62131837 | 6/1987 |
| JP | 01233129 | 9/1989 |
| JP | 5139203 | 6/1993 |
| JP | 5342901 | 12/1993 |
| JP | 6151067 | 5/1994 |
| JP | 6267304 | 9/1994 |
| JP | 6276524 | 9/1994 |
| JP | 6295601 | 10/1994 |
| JP | 6321007 | 11/1994 |
| JP | 732936 | 2/1995 |
| JP | 747878 | 2/1995 |
| JP | 7052706 | 2/1995 |
| JP | 769125 | 3/1995 |
| JP | 8166221 | 6/1996 |
| JP | 8221700 | 8/1996 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Löwenau, J.P. et al., SAE Paper No. 980007, "Adaptive Light Control—A New Light Concept Controlled by Vehicle Dynamics and Navigation," pp. 33-38.

Kormanyos, Christopher M., SAE Paper No. 980003, "HID System with Adaptive Vertical Aim Control," pp. 13-18.

Kalze, Franz-Josef, SAE Paper No. 980005, "Xenon Light for Main and Dipped Beam," pp. 23-26.

Shimizu, Tohru et al., SAE Paper No. 980322, "Development of PWM DRL with Low RF Emissions and Low Heat," pp. 113-117.

\* cited by examiner

VEHICLE IMAGING SYSTEM PROVIDING MULTI-STAGE AIMING STABILITY INDICATION

CROSS-REFERENCE TO RELATED APPLICATION

This application claims the priority benefit of U.S. Provisional Patent Application No. 61/658,686 entitled "VEHICLE IMAGING SYSTEM PROVIDING MULTI-STAGE AIMING STABILITY INDICATION," filed on Jun. 12, 2012, by Phillip R. Pierce et al., the entire disclosure of which is incorporated herein by reference.

FIELD OF THE INVENTION

The present invention generally relates to vehicle imaging systems, and more specifically relates to improvements in systems that automatically aim an image sensor used in a vehicle.

SUMMARY OF THE INVENTION

According to one aspect of the present invention, a system is provided for controlling equipment of a controlled vehicle, comprising: an imaging system including an image sensor configured to acquire images of a scene external of the controlled vehicle and to generate image data corresponding to the acquired images; and a controller in communication with the imaging system, the controller configured to receive and analyze the image data, to generate a control signal that is used to control the equipment, and to automatically aim the image sensor, wherein the control signal includes an aim stability indication.

According to another aspect of the present invention, a system is provided for controlling equipment of a controlled vehicle, comprising: an imaging system including an image sensor configured to acquire images of a scene external of the controlled vehicle and to generate image data corresponding to the acquired images; and a controller in communication with the image sensor, the controller configured to receive and analyze the image data, to generate a control signal that is used to control the equipment, and to automatically aim the image sensor, wherein the controller analyzes the image data to determine a stability state for the aim of the image sensor.

According to another aspect of the present invention, a method is provided for determining a stability state for the aim of an image sensor of a controlled vehicle. The method comprises the steps of: (a) acquiring an image of a scene external of the controlled vehicle using the image sensor and generating image data corresponding to the acquired image; (b) receiving and analyzing the image data in a controller to detect an aim point within the image data based on at least one position of at least one object detected in the acquired image; (c) acquiring a subsequent image of the scene external of the controlled vehicle using the image sensor and generating subsequent image data corresponding to the subsequently acquired image; (d) receiving and analyzing the subsequent image data in the controller to detect a subsequent aim point within the subsequent image data based on at least one position of at least one object detected in the subsequently acquired image; (e) determining whether a position of the detected subsequent aim point has changed from that of the previous aim point so as to cause an auto aim position to change; (f) repeating steps (c) through (e) while tracking a number of sequential times that it is determined in step (e) that a position of the detected subsequent aim point has not changed from that of the previous aim point so as to cause an auto aim position to change; and (g) determining a stability state for the aim of the image sensor based at least in part upon an auto aim stability count corresponding to the number of sequential times that it is determined in step (e) that a position of the detected subsequent aim point has not changed from that of the previous aim point so as to cause an auto aim position to change.

According to another aspect of the present invention, a non-transitory computer readable medium is provided having stored thereon software instructions that, when executed by a processor, cause the processor to determine a stability state for the aim of an image sensor of a controlled vehicle, by executing the steps comprising: (a) acquiring an image of a scene external of a controlled vehicle using the image sensor and generating image data corresponding to the acquired image; (b) receiving and analyzing the image data in the processor to detect an aim point within the image data based on at least one position of at least one object detected in the acquired image; (c) acquiring a subsequent image of the scene external of the controlled vehicle using the image sensor and generating subsequent image data corresponding to the subsequently acquired image; (d) receiving and analyzing the subsequent image data in the processor to detect a subsequent aim point within the image data based on at least one position of at least one object detected in the subsequently acquired image; (e) determining whether a position of the detected subsequent aim point has changed from that of the previous aim point so as to cause an auto aim position to change; (f) repeating steps (a) through (e) while tracking a number of sequential times that it is determined in step (e) that a position of the detected subsequent aim point has not changed from that of the previous aim point so as to cause an auto aim position to change; and (g) determining a stability state for the aim of the image sensor based at least in part upon an auto aim stability count corresponding to the number of sequential times that it is determined in step (e) that a position of the detected subsequent aim point has not changed from that of the previous aim point so as to cause an auto aim position to change.

According to another embodiment of the invention, an exterior light control is provided for controlling exterior lights of a controlled vehicle. The exterior light control includes an imaging system including an image sensor configured to acquire images of a scene external of the controlled vehicle and to generate image data corresponding to the acquired images; and a controller in communication with the image sensor, the controller configured to receive and analyze the image data, to generate an exterior light control signal that is used to control the exterior lights, and to automatically aim the image sensor, wherein the controller analyzes the image data to determine a stability state for the aim of the image sensor.

These and other features, advantages, and objects of the present invention will be further understood and appreciated by those skilled in the art by reference to the following specification, claims, and appended drawings.

BRIEF DESCRIPTION OF THE DRAWINGS

The present invention will be become more fully understood from the detailed description and the accompanying drawings, wherein.

DETAILED DESCRIPTION OF THE PREFERRED EMBODIMENTS

Figure 1:
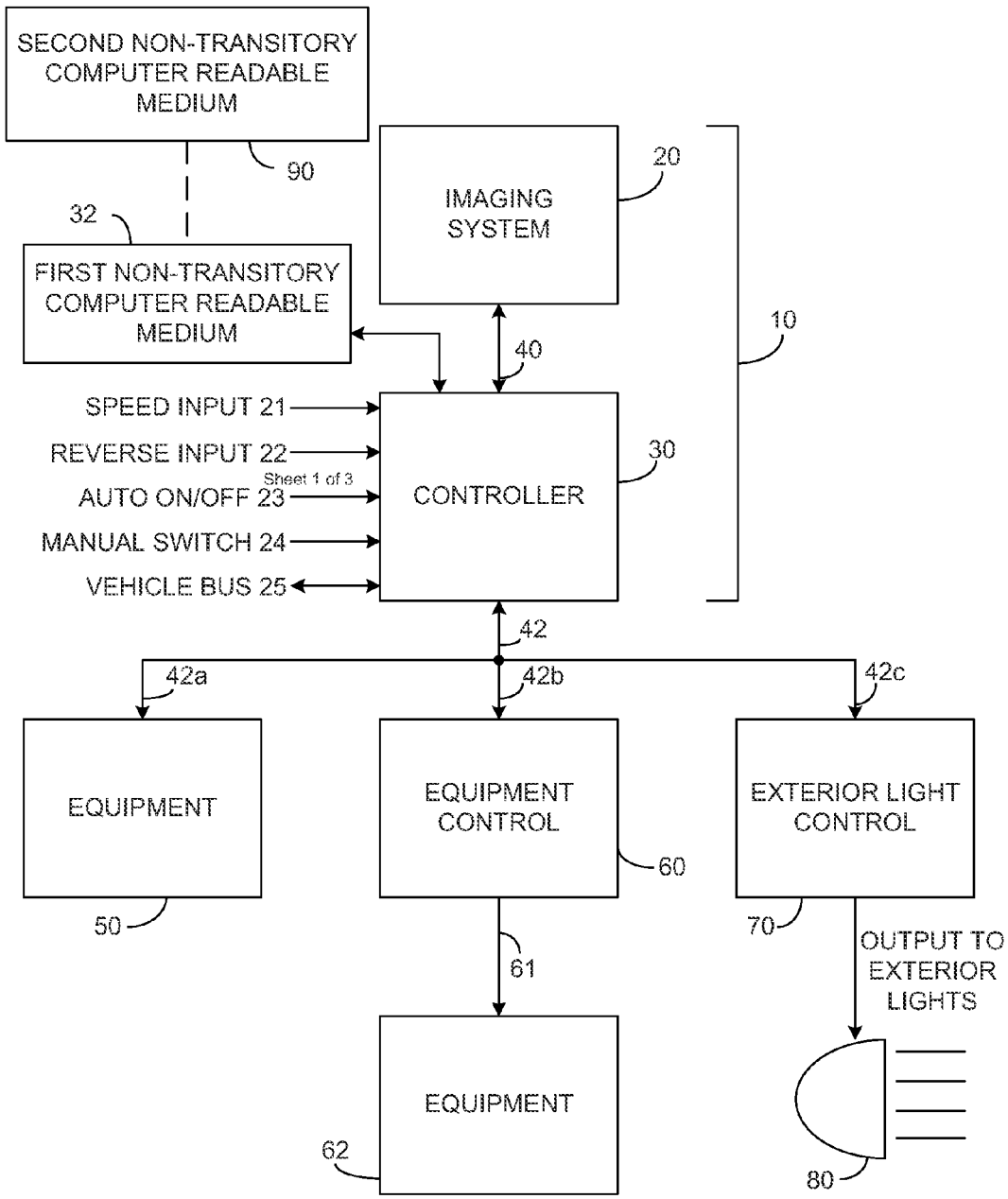
FIG. 1 is a block diagram of a system constructed according to one embodiment.

Reference will now be made in detail to the present preferred embodiments, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

The embodiments described herein relate to an imaging system used in a vehicle where the imaging system includes an image sensor (or camera) to capture images that may then be displayed and/or analyzed in order to control vehicle equipment. For example, such imagers have been used for lane departure warning systems, forward collision warning systems, adaptive cruise control systems, pedestrian detection systems, night vision systems, terrain detection systems, parking assist systems, traffic sign recognition systems, reverse camera display systems, and exterior light control systems. Examples of systems using imagers for such purposes are disclosed in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, and in published United States Application Publication No. US 20130028473 A1, the entire disclosures of which are incorporated herein by reference.

In some of the exemplary prior systems, the image sensor is mounted in the vehicle and then the system undergoes an aiming process in the factory. Some auto manufacturers find such factory aiming to be a time-consuming nuisance. In addition, if the image sensor is mounted to a vehicle windshield and the windshield is replaced, the image sensor would need to be re-aimed in the field. In other situations, such as when a driver loads the vehicle with a heavy load in the trunk or rear of the vehicle, the image sensor aim should be dynamically adjusted but cannot with only factory aiming. This led to the development of imaging systems that automatically adjust the aim of the image sensor based upon detection of particular objects in the imaged scene. Such objects may include lane markers (and particularly where they appear to converge in the distance), taillights, street lights, and portions of the exterior of the vehicle itself that may be within the captured image. Examples of such systems are disclosed in U.S. Pat. Nos. 6,049,171, 7,881,839, and 7,720,580, the entire disclosures of which are incorporated herein by reference.

A first embodiment of system 10 is shown in FIG. 1. System 10 is provided for controlling equipment (50, 62, and 80) of a controlled vehicle. System 10 includes an imaging system 20 and a controller 30. Imaging system 20 includes an image sensor (201, FIG. 3) that is configured to image a scene external of the controlled vehicle and to generate image data corresponding to the acquired images. Controller 30 receives and analyzes the image data and generates a control signal that is used to control the equipment (50, 62, and 80). The control signal is generated in response to analysis of the image data.

Controller 30 may be configured to directly connect to the equipment (50) being controlled such that the generated control signals directly control the equipment. Alternatively, controller 30 may be configured to connect to an equipment control (60 and 70), which, in turn, is connected to the equipment being controlled (62 and 80) such that the control signals generated by controller 30 only indirectly control the equipment. For example, in the case of the equipment being exterior lights 80, controller 30 may analyze the image data from imaging system 20 so as to generate control signals that are more of a recommendation for an exterior light control (70) to use when controlling exterior lights (80). The control signals may further include not just a recommendation, but also a code representing a reason for the recommendation so that equipment control (60 and 70) may determine whether or not to override a recommendation. Further, as described in detail below, the control signal may include an indication of the aim stability of the image sensor. Such an aim stability indication is particularly useful when an equipment control (60 and 70) that is separate from controller 30 performs the direct control of the equipment.

As described further below, controller 30 analyzes the image data to determine the stability of the aim of the image sensor based upon a series of images captured over time and a determination as to whether the aim point has changed within those images. Thus, the aim stability indication represents a degree of confidence that the image sensor is properly aimed.

By providing an aim stability indication, controller 30 provides additional information to equipment control (60 and 70) that was not previously made available to such equipment control(s). This allows the vehicle manufacturer more flexibility in how they choose to configure each equipment control (60 and 70) to respond to the aim stability indication.

The present imaging system improves upon the above-mentioned auto aiming systems by providing a system 10 that allows auto manufacturers to respond in a manner of their choosing to the aim stability indication. This also allows one common system to be used for all manufacturers regardless of whether they wish to commence equipment control once the earliest possible aiming has taken place or whether they wish to commence equipment control once the aim has become more stable. Further, different features of equipment control may be enabled or disabled based upon the stability of the aim. In addition, different equipment may respond differently to the aim stability indication. For example, higher aim stability may be desired for enabling a lane departure warning or enabling adaptive cruise control than may be desired for initially enabling a night vision system.

As shown in FIG. 1, various inputs (such as inputs 21-24) may be provided to controller 30 that may be taken into account in forming a recommendation or direct control signal. In some cases, such inputs may instead be provided to equipment control (60 and 70). For example, input from manual switches may be provided to equipment control (60 and 70), which may allow equipment control (60 and 70) to override a recommendation from controller 30. It will be appreciated that various levels of interaction and cooperation between controller 30 and equipment controls (60 and 70) may exist. One reason for separating control functions is to allow imaging system 20 to be located in the best location in the vehicle for obtaining images, which may be a distance from the equipment to be controlled, and to allow communication over the vehicle bus 25.

According to one embodiment, the equipment that system 10 controls may include one or more exterior lights 80 and the control signal generated by controller 30 may be an exterior light control signal. In this embodiment, exterior lights 80 may be controlled directly by controller 30 or by an exterior light control 70, which receives a control signal from controller 30.

Prior systems are known for controlling exterior vehicle lights in response to images captured forward of the vehicle.

In these prior systems, a controller would analyze the captured images and determine if any preceding or oncoming vehicles were present in a glare area in front of the vehicle employing the system. This "glare area" was the area in which the exterior lights would cause excessive glare to a driver if the exterior lights were in a high beam state (or some state other than a low beam state). If a vehicle was present in the glare area, the controller would respond by changing the state of the exterior lights so as to not cause glare for the other driver(s). Examples of such systems are described in U.S. Pat. Nos. 5,837,994, 5,990,469, 6,008,486, 6,049,171, 6,130,421, 6,130,448, 6,166,698, 6,379,013, 6,403,942, 6,587,573, 6,611,610, 6,631,316, 6,774,988, 6,861,809, 7,321,112, 7,417,221, 7,565,006, 7,567,291, 7,653,215, 7,683,326, 7,881,839, 8,045,760, and 8,120,652, the entire disclosures of which are incorporated herein by reference.

In the example shown in FIG. 1, imaging system 20 may be controlled by controller 30. Communication of imaging system parameters as well as image data occurs over a communication bus 40, which may be a bi-directional serial bus, parallel bus, a combination of both, or other suitable means. Controller 30 serves to perform equipment control functions by analyzing images from imaging system 20, determining an equipment (or exterior light) state based upon information detected within those images, and communicating the determined equipment (or exterior light) state to the equipment 50, equipment control 60, or exterior light control 70 through a bus 42, which may be the vehicle bus 25, a CAN bus, a LIN bus or any other suitable wired or wireless communication link. Controller 30 may control imaging system 20 to be activated in several different modes with different exposure times and different readout windows. Because of this complexity, controller 30 may be used to both perform the equipment or exterior light control function and control the parameters of imaging system 20.

Controller 30 can also take advantage of the availability of signals (such as vehicle speed) communicated via discrete connections or over the vehicle bus 25 in making decisions regarding the operation of the exterior lights 80. In particular, a speed input 21 provides vehicle speed information to controller 30 from which speed can be a factor in determining the control state for exterior lights 80 or other equipment. A reverse signal 22 informs controller 30 that the vehicle is in reverse, responsive to which controller 30 may clear an electrochromic mirror element regardless of signals output from light sensors. An auto ON/OFF switch input 23 is connected to a switch having two states to dictate to controller 30 whether the vehicle exterior lights 80 should be automatically or manually controlled. The auto ON/OFF switch (not shown) connected to the ON/OFF switch input 23 may be incorporated with the headlamp switches that are traditionally mounted on the vehicle instrument panel or incorporated into a steering wheel column. A manual dimmer switch input 24 is connected to a manually actuated switch (not shown) to provide a manual override signal for an exterior light control state. Some or all of inputs 21, 22, 23, 24 and outputs 42a, 42b, and 42c, as well as any other possible inputs or outputs, such as a steering wheel input, can optionally be provided through vehicle bus 25 shown in FIG. 1. Alternatively, some or all of these and other inputs 21-24 may be provided to equipment control 60 or exterior light control 70.

Controller 30 can control, at least in part, other equipment 50 within the vehicle which is connected to controller 30 via bus 42. Specifically, the following are some examples of equipment 50 that may be controlled by controller 30: exterior lights 80, a rain sensor, a compass, information displays, windshield wipers, a heater, a defroster, a defogger, an air conditioning system, a telephone system, a navigation system, a security system, a tire pressure monitoring system, a garage door opening transmitter, a remote keyless entry system, a telematics system, a voice recognition system such as a digital signal processor-based voice actuation system, a vehicle speed control, interior lights, rearview mirrors, an audio system, an engine control system, and various other switches and other display devices that may be located throughout the vehicle.

In addition, controller 30 may be, at least in part, located within a rearview assembly of a vehicle or located elsewhere within the vehicle. Controller 30 may also use a second controller (or controllers), equipment control 60, which may be located in a rearview assembly or elsewhere in the vehicle, in order to control certain kinds of equipment 62. Equipment control 60 can be connected to receive control signals generated by controller 30 via bus 42. Equipment control 60 subsequently communicates and controls equipment 62 via bus 61 or vehicle bus 25. For example, equipment control 60 may be a windshield wiper control unit which controls windshield wiper equipment, turning this equipment ON or OFF. Equipment control may also be an electrochromic mirror control unit where controller 30 is programmed to communicate with the electrochromic control unit in order for the electrochromic control unit to change the reflectivity of the electrochromic mirror(s) in response to information obtained from an ambient light sensor, a glare sensor, as well as any other components coupled to controller 30. Specifically, equipment control unit 60 in communication with controller 30 may control the following equipment: exterior lights, a rain sensor, a compass, information displays, windshield wipers, a heater, a defroster, a defogger, air conditioning, a telephone system, a navigation system, a security system, a tire pressure monitoring system, a garage door opening transmitter, a remote keyless entry, a telemetry system, a voice recognition system such as a digital signal processor-based voice actuation systems, a vehicle speed, interior lights, rearview mirrors, an audio system, a climate control, an engine control, and various other switches and other display devices that may be located throughout the vehicle.

The method for determining a stability state for the aim of the image sensor will now be described with reference to FIG. 2. This method is described below as being implemented by controller 30 using image data received from imaging system 20. This method may be a subroutine executed by any processor, and thus this method may be embodied in a non-transitory computer readable medium having stored thereon software instructions that, when executed by a processor, cause the processor to control the equipment of the controlled vehicle, by executing the steps of the method described below. In other words, aspects of the inventive method may be achieved by software stored on a non-transitory computer readable medium or software modifications or updates to existing software residing in a non-transitory computer readable medium. Such software or software updates may be downloaded into a first non-transitory computer readable media 32 of controller 30 (or locally associated with controller 30 or some other processor) typically prior to being installed in a vehicle, from a second non-transitory computer readable media 90 located remote from first non-transitory computer readable media 32. Second non-transitory computer readable media 90 may be in communication with first non-transitory computer readable media 32 by any suitable means, which may at least partially include the Internet or a local or wide area wired or wireless network.

In general, the method for determining a stability state for the aim of an image sensor of a controlled vehicle, comprises:

(a) acquiring an image of a scene external of the controlled vehicle using the image sensor and generating image data corresponding to the acquired image; (b) receiving and analyzing the image data in a controller to detect an aim point within the image data based on at least one position of at least one object detected in the acquired image; (c) acquiring a subsequent image of the scene external of the controlled vehicle using the image sensor and generating subsequent image data corresponding to the subsequently acquired image; (d) receiving and analyzing the subsequent image data in the controller to detect a subsequent aim point within the subsequent image data based on at least one position of at least one object detected in the subsequent acquired image; (e) determining whether a position of the detected subsequent aim point has changed from that of the previous aim point so as to cause an auto aim position to change; (f) repeating steps (c) through (e) while tracking a number of sequential times that it is determined in step (e) that a position of the detected subsequent aim point has not changed from that of the previous aim point so as to cause an auto aim position to change; and (g) determining a stability state for the aim of the image sensor based at least in part upon an auto aim stability count corresponding to the number of sequential times that it is determined in step (e) that a position of the detected subsequent aim point has not changed from that of the previous aim point so as to cause an auto aim position to change. The method may further comprise the step of selecting a stability state from at least the following states: a not stable state; a semi-stable state; and a stable state. The step of selecting a stability state may comprise: selecting the semi-stable state if the auto aim stability count reaches a first threshold, selecting the stable state if the auto aim stability count reaches a second threshold, and otherwise selecting the not stable state. The method may further comprise generating a control signal that is used to control equipment of the controlled vehicle in response to analysis of the image data, wherein the control signal includes an aim stability indication representing the selected stability state.

Figure 2:
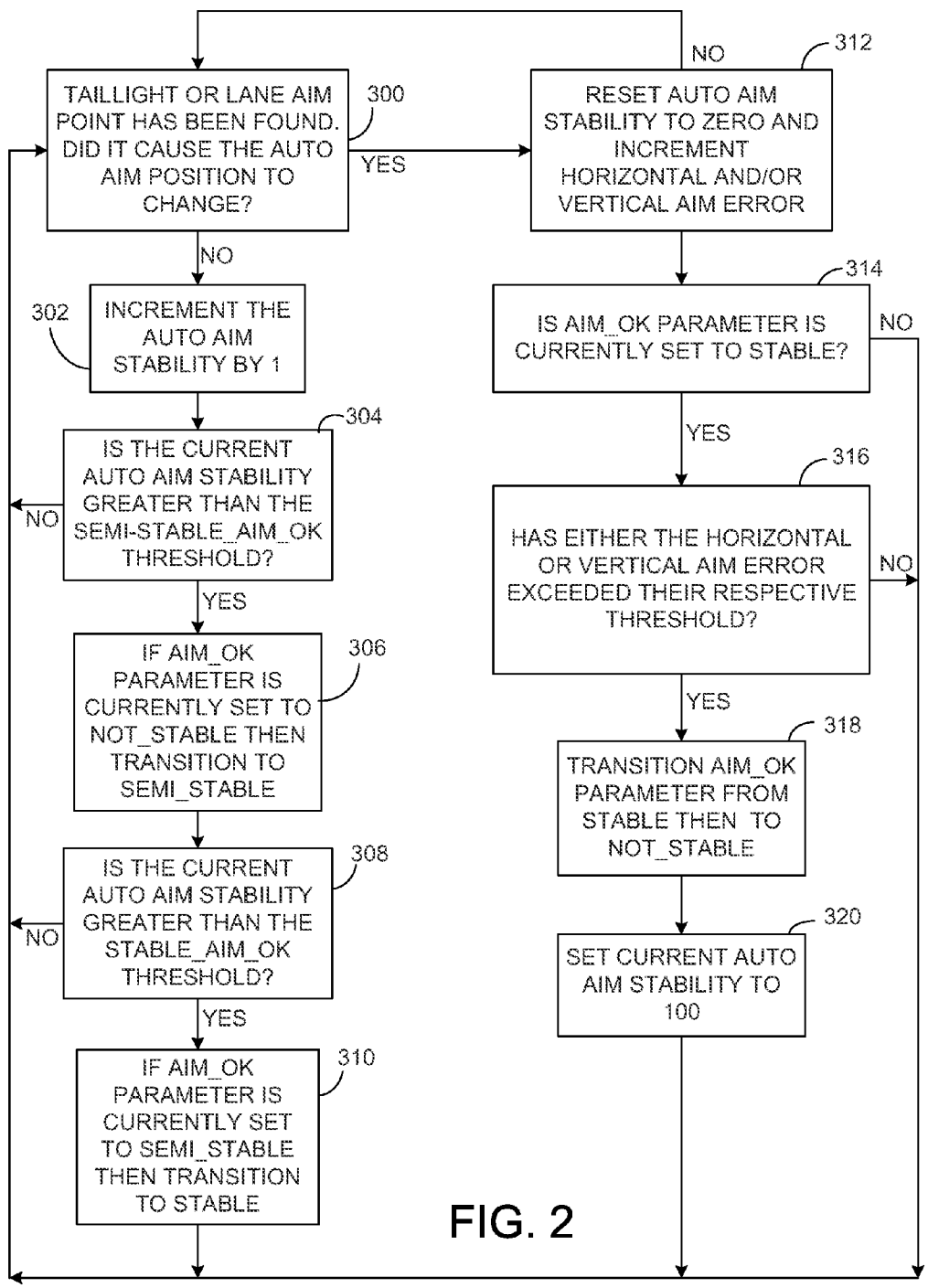
FIG. 2 is a flow chart illustrating operation of the system.

FIG. 2 shows a general flow chart illustrating various steps to be executed by controller 30. As shown in FIG. 2, the method may begin with step 300 in which controller 30 determines whether a taillight or lane aim point has been found and whether it caused the auto aim position to change. Details of how to make these determinations are disclosed in commonly assigned U.S. Pat. No. 7,881,839, the entire disclosure of which is incorporated herein by reference. If the taillight or lane aim point did not cause the auto aim position to change, controller 30 then increments the Auto Aim Stability variable by "1" in step 302. Controller 30 next determines whether the current value of the Auto Aim Stability variable is greater than a Semi_Stable_Aim_OK threshold in step 304. If not, controller 30 loops back to step 300. So long as the taillight or lane aim point did not cause the auto aim position to change, controller 30 will continue to loop through steps 300-304 while each time incrementing the Auto Aim Stability variable until it is greater than the Semi_Stable_Aim_OK threshold. In this case, controller 30 sets an Aim_OK parameter to Semi_Stable if it was previously set to Not_Stable in step 306. Otherwise, controller 30 just maintains the setting of Aim_OK parameter.

Controller 30 then determines whether the current value of the Auto Aim Stability variable is greater than a Stable_Aim_OK threshold in step 308. If not, controller 30 loops back to step 300 and continues to execute steps 300 through 308 until either the current value of the Auto Aim Stability variable is greater than the Stable_Aim_OK threshold or the taillight or lane aim point caused the auto aim position to change. If the Auto Aim Stability variable is greater than the Stable_Aim_OK threshold, controller 30 sets the Aim_OK parameter to Stable if it was previously set to Semi_Stable in step 310. Otherwise, controller 30 just maintains the setting of Aim_OK parameter to Stable. Controller 30 then returns to step 300 and continues to loop through steps 300-310 until controller 30 determines in step 300 that the taillight or lane aim point caused the auto aim position to change.

If the taillight or lane aim point caused the auto aim position to change, controller 30 proceeds from step 300 to step 312 in which it resets the Auto Aim Stability variable to "0" and increments a Horizontal and/or Vertical Aim Error variable depending on whether the Taillight or Lane Aim point has changed positions horizontally, vertically, or both. Then, controller 30 executes step 314 in which it determines whether the Aim_OK parameter is set to Stable and if so, controller 30 determines in step 316 whether either the Horizontal or Vertical Aim Error variable has exceeded their respective threshold. An example of the Horizontal Aim Error threshold is 0.8 degrees and an example of the Vertical Aim Error threshold is 0.4 degrees. If controller 30 determines in step 314 that the Aim_OK parameter is set to Not_Stable or Semi_Stable (i.e., not set to Stable), controller 30 maintains the Aim_OK parameter setting and returns to step 300. If the Horizontal or Vertical Aim Error variable has not exceeded their respective threshold, controller 30 maintains the Aim_OK parameter setting as Stable and returns to step 300. Otherwise, controller 30 proceeds from step 316 to step 318 in which controller 30 transitions the Aim_OK parameter from Stable to Not_Stable. Next, controller 30 sets the current Auto Aim Stability variable to "100" in step 320 before returning to step 300. By setting the current Auto Aim Stability variable to "100," the Aim_OK may be returned to Stable more quickly after it has transitioned from Stable to Not_Stable. This is possible because the amount of Aim Error is typically less in this case than in the initial condition. By analyzing the Horizontal and Vertical Aim Error, controller 30 only changes from a Stable aim state if this error exists for a specific period of time or if this error is sufficiently large to warrant a change.

As mentioned above, equipment control(s) 60 and 70 may respond to the aim stability indication (Aim_OK parameter) in a variety of ways. For example, if the Aim_OK parameter is set to Not_Stable, equipment control(s) 60 and 70 may disable (or keep disabled) the equipment or some aspect of the equipment operation. For example, if the equipment is exterior lights 80, an exterior light control 70 may respond to the Not_Stable Aim_OK parameter by disabling automatic control of exterior lights 80 and instead rely upon manual operation. In most cases, exterior light control 70 would respond to the Stable Aim_OK parameter by enabling automatic control of exterior lights 80. Depending on manufacturer preferences, exterior light control 70 may respond to the Semi_Stable Aim_OK parameter by either enabling automatic control of exterior lights 80 or by disabling (or keeping disabled) automatic control of exterior lights 80.

System 10 may also be responsive to the different states of the Aim_OK parameter by altering filter coefficients used to identify a new taillight or lane aim point. In other words, controller 30 may alter how much weight to put on a change in a detected taillight or lane aim point based on the current stability state. More specifically, when the Aim_OK parameter is Stable, controller 30 is more particular about which taillight or lane aim points it uses to determine if there is an error in aim, whereas the filtering is less stringent when the Aim_OK parameter is either Not_Stable or Semi_Stable. It is also possible to use an intermediate filtering level when the Aim_OK parameter is Semi_Stable.

The Semi-Stable_Aim_OK threshold and Stable_Aim_OK thresholds are selected to target particular degrees of alignment within the various states of stability. For example, the Semi-Stable_Aim_OK threshold may be selected to obtain a stability of within 1 degree for the Semi-Stable state and Stable_Aim_OK threshold may be selected to obtain a stability of within ½ degree for the Stable state. Thus, for example, the Semi_Stable_Aim_OK threshold may be between 20 seconds and 100 seconds, and the Stable_Aim_OK threshold may be greater than or equal to 100 seconds with valid taillight or lane aim points.

Controller 30 generates a control signal at least whenever the Aim_OK parameter changes. Control signals may also be generated at various other times while the Aim_OK parameter is set to either Stable or Semi-Stable such as when a recommendation is otherwise being made as to the control of the equipment. By including the aim stability indication (Aim_OK parameter) in the control signal, the equipment control may choose to respond or not respond to the recommendation when the Aim_OK parameter is set to Semi-Stable depending upon the manufacturer's preference.

Although only three states are described above for the Aim_OK parameter, there may be more states if manufacturers desire to operate differently at still additional levels of stability.

Further, although the example shown in FIG. 2 uses a taillight or lane aim point, aim points may be derived from other objects in the imaged scene including, but not limited to, streetlights and exterior portions of the vehicle.

Although a particular method is described above that determines a number of sequential instances of having no change to the aim point, and compares that number to thresholds to determine whether the aim is stable, semi-stable, or not stable, other methods may be used such as determining the rate at which the aim point is changing and using that rate to determine stability of the aim. For example, the larger the changes between aim points, and hence more rapid the rate of change of the aim points, the more unstable the aim point. Likewise, the smaller the changes to the aim point, the lower the rate of change is, and thus, the more stable the aim.

As noted above, one embodiment of the present invention generally pertains to a control system for controlling the exterior lights of a vehicle. As used herein, the "exterior lights" broadly includes any exterior lighting on the vehicle. Such exterior lights may include headlamps (both low and high beam if separate from one another), taillights, foul weather lights such as fog lights, brake lights, center-mounted stop lights (CHMSLs), turn signals, back-up lights, etc. The exterior lights may be operated in several different modes including conventional low-beam and high-beam states. They may also be operated as daytime running lights, and additionally as super-bright high beams in those countries where they are permitted.

The exterior light brightness may also be continuously varied between the low, high, and super-high states. Separate lights may be provided for obtaining each of these exterior lighting states or the actual brightness of the exterior lights may be varied to provide these different exterior lighting states. In either case, the "perceived brightness" or illumination pattern of the exterior lights is varied. As used herein, the term "perceived brightness" means the brightness of the exterior lights as perceived by an observer outside the vehicle. Most typically, such observers will be drivers or passengers in a preceding vehicle or in a vehicle traveling along the same street in the opposite direction. Ideally, the exterior lights are controlled such that if an observer is located in a vehicle within a "glare area" relative to the vehicle (i.e., the area in which the observer would perceive the brightness of the exterior lights as causing excessive glare), the beam illumination pattern is varied such that the observer is no longer in the glare area. The perceived brightness and/or glare area of the exterior lights may be varied by changing the illumination output of one or more exterior lights, by steering one or more lights to change the aim of one or more of the exterior lights, selectively blocking or otherwise activating or deactivating some or all of the exterior lights, altering the illumination pattern forward of the vehicle, or a combination of the above.

Imaging system 20 may be any conventional system. Examples of suitable imaging systems are disclosed in published United States Patent Application Publication Nos. US 20080192132 A1 and US 20120072080 A1, and in U.S. Provisional Application Nos. 61/500,418 entitled "MEDIAN FILTER" filed on Jun. 23, 2011, by Jon H. Bechtel et al.; 61/544,315 entitled "MEDIAN FILTER" and filed on Oct. 7, 2011, by Jon H. Bechtel et al.; 61/556,864 entitled "HIGH DYNAMIC RANGE CAMERA LOW LIGHT LEVEL FILTERING" filed on Nov. 8, 2011, by Jon H. Bechtel et al., the entire disclosures of which are incorporated herein by reference.

Figure 3:
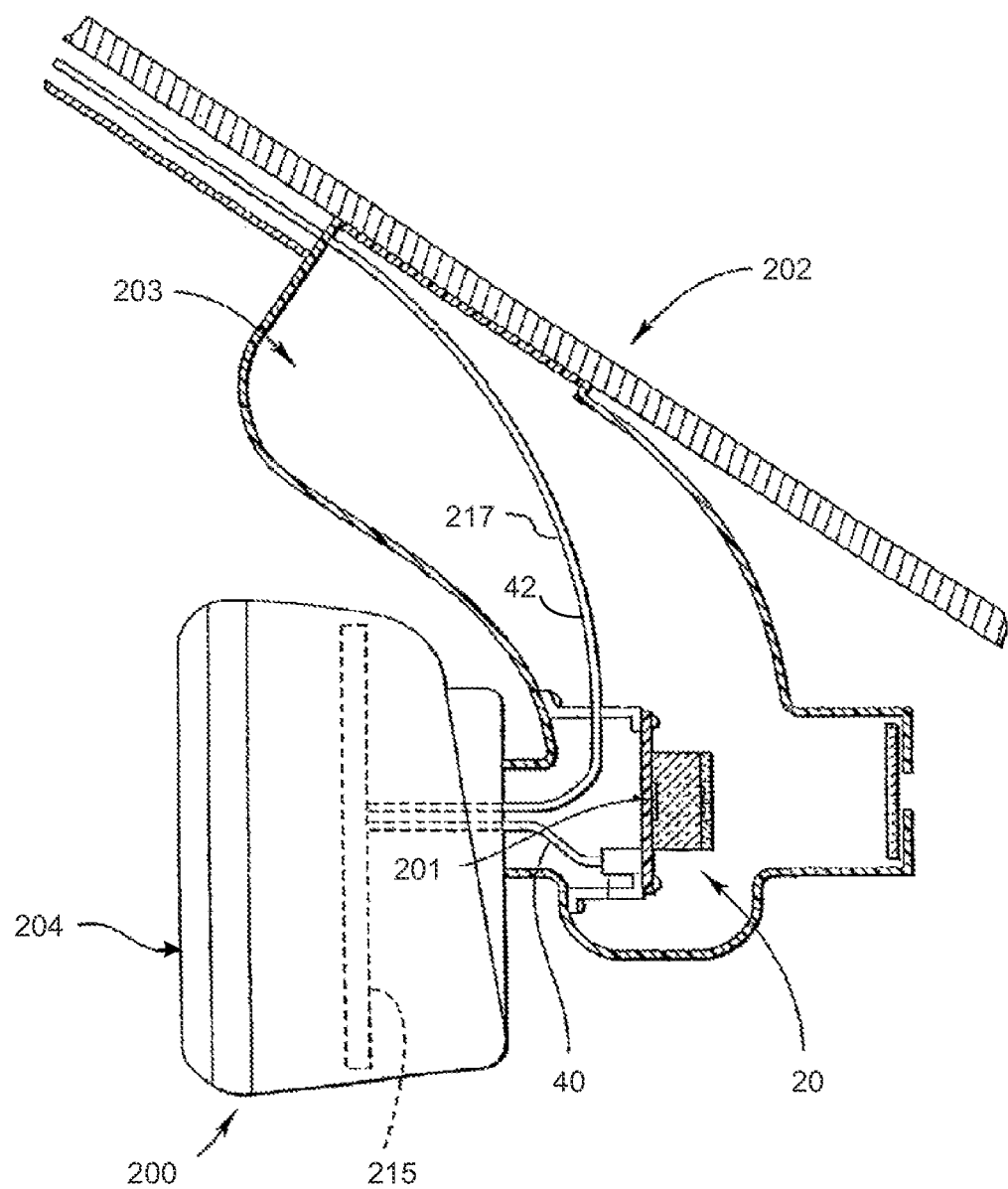
FIG. 3 is a partial cross section of a rearview assembly incorporating a system in accordance with another embodiment.

Portions of system 10 can be advantageously integrated into a rearview assembly 200 as illustrated in FIG. 3, wherein imaging system 20 is integrated into a mount 203 of rearview assembly 200. This location provides an unobstructed forward view through a region of the windshield 202 of the vehicle that is typically cleaned by the vehicle's windshield wipers (not shown). Additionally, mounting the image sensor 201 of imaging system 20 in the rearview assembly permits sharing of circuitry such as the power supply, microcontroller and light sensors with other components of rearview assembly 200.

Referring to FIG. 3, image sensor 201 is mounted within rearview mount 203, which is mounted to vehicle windshield 202. The rearview mount 203 provides an opaque enclosure for the image sensor with the exception of an aperture through which light is received from a forward external scene.

Controller 30 of FIG. 1 may be provided on a main circuit board 215 and mounted in a rearview housing 204 as shown in FIG. 3. As discussed above, controller 30 may be connected to imaging system 20 by bus 40 or other means. Main circuit board 215 may be mounted within rearview housing 204 by conventional means. Power and a communication link 42 with the vehicle electrical system, including the exterior lights 80 and other equipment 50 or equipment controllers (60 and 70) (FIG. 1), are provided via a vehicle wiring harness 217 (FIG. 3).

Rearview assembly 200 may include a mirror element or a display that displays a rearward view. The mirror element may be a prismatic element or an electro-optic element, such as an electrochromic element.

Additional details of the manner by which system 10 may integrated into a rearview mirror assembly 200 are described in U.S. Pat. No. 6,611,610, the entire disclosure of which is incorporated herein by reference. Alternative rearview mirror assembly constructions used to implement exterior light control systems are disclosed in U.S. Pat. No. 6,587,573, the entire disclosure of which is incorporated herein by reference.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. A system for controlling equipment of a controlled vehicle, comprising:
   an imaging system including an image sensor configured to acquire images of a scene external of the controlled vehicle and to generate image data corresponding to the acquired images; and
   a controller in communication with said imaging system, said controller configured to receive and analyze the image data, to generate a control signal that is used to control the equipment, and to automatically aim said image sensor,
   wherein the control signal includes an aim stability indication.

2. The system of claim 1, wherein said controller determines a stability state for the aim of said image sensor by selecting from at least three states based upon a duration at which the aim has not been adjusted.

3. The system of claim 2, wherein the at least three states include stable, not stable, and semi-stable.

4. The system of claim 1, wherein the system is at least one of: a lane departure warning system, a forward collision warning system, an adaptive cruise control system, a pedestrian detection system, a night vision system, a terrain detection system, a parking assist system, a traffic sign recognition system, a reverse camera display system, and an exterior light control system.

5. The system of claim 1, wherein: the system is an exterior light control system, the equipment includes exterior lights of the controlled vehicle, and the control signal is an exterior light control signal that is used to control the exterior lights.

6. A system for controlling equipment of a controlled vehicle, comprising:
   an imaging system including an image sensor configured to acquire images of a scene external of the controlled vehicle and to generate image data corresponding to the acquired images; and
   a controller in communication with said image sensor, said controller configured to receive and analyze the image data, to generate a control signal that is used to control the equipment, and to automatically aim said image sensor,
   wherein said controller analyzes the image data to determine a stability state for the aim of said image sensor,
   wherein said controller determines the stability state for the aim of said image sensor by selecting from at least three states based upon a duration at which the aim has not been adjusted.

7. The system of claim 6, wherein the at least three states include stable, not stable, and semi-stable.

8. The system of claim 6, wherein the control signal includes an aim stability indication that indicates the stability state.

9. The system of claim 6, wherein the system is at least one of: a lane departure warning system, a forward collision warning system, an adaptive cruise control system, a pedestrian detection system, a night vision system, a terrain detection system, a parking assist system, a traffic sign recognition system, a reverse camera display system, and an exterior light control system.

10. The system of claim 6, wherein: the system is an exterior light control system, the equipment includes exterior lights of the controlled vehicle, and the control signal is an exterior light control signal that is used to control the exterior lights.

11. A method for determining a stability state for the aim of an image sensor of a controlled vehicle, comprising:
    (a) acquiring an image of a scene external of the controlled vehicle using the image sensor and generating image data corresponding to the acquired image;
    (b) receiving and analyzing the image data in a controller to detect an aim point within the image data based on at least one position of at least one object detected in the acquired image;
    (c) acquiring a subsequent image of the scene external of the controlled vehicle using the image sensor and generating subsequent image data corresponding to the subsequently acquired image;
    (d) receiving and analyzing the subsequent image data in the controller to detect a subsequent aim point within the subsequent image data based on at least one position of at least one object detected in the subsequently acquired image;
    (e) determining whether a position of the detected subsequent aim point has changed from that of the previous aim point so as to cause an auto aim position to change;
    (f) repeating steps (c) through (e) while tracking a number of sequential times that it is determined in step (e) that a position of the detected subsequent aim point has not changed from that of the previous aim point so as to cause an auto aim position to change; and
    (g) determining a stability state for the aim of the image sensor based at least in part upon an auto aim stability count corresponding to the number of sequential times that it is determined in step (e) that a position of the detected subsequent aim point has not changed from that of the previous aim point so as to cause an auto aim position to change.

12. The method of claim 11, and further comprising the step of selecting a stability state from at least the following states: a not stable state; a semi-stable state; and a stable state.

13. The method of claim 12, wherein the step of selecting a stability state comprises:
    selecting the semi-stable state if the auto aim stability count reaches a first threshold, selecting the stable state if the auto aim stability count reaches a second threshold, and otherwise selecting the not stable state.

14. The method of claim 11, and further comprising:
    generating a control signal that is used to control equipment of the controlled vehicle in response to analysis of the image data, wherein the control signal includes an aim stability indication representing the selected stability state.

15. A non-transitory computer readable medium having stored thereon software instructions that, when executed by a processor, cause the processor to determine a stability state for the aim of an image sensor of a controlled vehicle, by executing the steps comprising:
    (a) acquiring an image of a scene external of a controlled vehicle using the image sensor and generating image data corresponding to the acquired image;
    (b) receiving and analyzing the image data in the processor to detect an aim point within the image data based on at least one position of at least one object detected in the acquired image;
    (c) acquiring a subsequent image of the scene external of the controlled vehicle using the image sensor and generating subsequent image data corresponding to the subsequently acquired image;

(d) receiving and analyzing the subsequent image data in the processor to detect a subsequent aim point within the subsequent image data based on at least one position of at least one object detected in the subsequently acquired image;

(e) determining whether a position of the detected subsequent aim point has changed from that of the previous aim point so as to cause an auto aim position to change;

(f) repeating steps (c) through (e) while tracking a number of sequential times that it is determined in step (e) that a position of the detected subsequent aim point has not changed from that of the previous aim point so as to cause an auto aim position to change; and (g) determining a stability state for the aim of the image sensor based at least in part upon an auto aim stability count corresponding to the number of sequential times that it is determined in step (e) that a position of the detected subsequent aim point has not changed from that of the previous aim point so as to cause an auto aim position to change.

16. The non-transitory computer readable medium of claim 15, and further comprising the step of selecting a stability state from at least the following states: a not stable state; a semi-stable state; and a stable state.

17. The non-transitory computer readable medium of claim 16, wherein the step of selecting a stability state comprises:
selecting the semi-stable state if the auto aim stability count reaches a first threshold, selecting the stable state if the auto aim stability count reaches a second threshold, and otherwise selecting the not stable state.

18. The non-transitory computer readable medium of claim 15, and further comprising:
generating a control signal that is used to control equipment of the controlled vehicle in response to analysis of the image data, wherein the control signal includes an aim stability indication representing the selected stability state.

19. The non-transitory computer readable medium of claim 15, wherein the image sensor is a part of at least one of: a lane departure warning system, a forward collision warning system, an adaptive cruise control system, a pedestrian detection system, a night vision system, a terrain detection system, a parking assist system, a traffic sign recognition system, a reverse camera display system, and an exterior light control system.

* * * * *